US012444529B2

(12) United States Patent
Nagai et al.

(10) Patent No.: US 12,444,529 B2
(45) Date of Patent: Oct. 14, 2025

(54) MULTILAYER COIL COMPONENT

(71) Applicant: TDK CORPORATION, Tokyo (JP)

(72) Inventors: Yusuke Nagai, Tokyo (JP); Hidekazu Sato, Tokyo (JP); Kazuhiro Ebina, Tokyo (JP); Kunihiko Kawasaki, Tokyo (JP); Takahiro Sato, Tokyo (JP); Kouichi Kakuda, Tokyo (JP); Yuya Ishima, Tokyo (JP); Shinichi Kondo, Tokyo (JP); Shinichi Sato, Tokyo (JP); Masaki Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 922 days.

(21) Appl. No.: 17/666,170

(22) Filed: Feb. 7, 2022

(65) Prior Publication Data

US 2022/0277879 A1 Sep. 1, 2022

(30) Foreign Application Priority Data

Mar. 1, 2021 (JP) ................................ 2021-031806

(51) Int. Cl.
*H01F 27/29* (2006.01)
*H01F 5/06* (2006.01)
*H01F 17/00* (2006.01)

(52) U.S. Cl.
CPC ........... *H01F 17/0013* (2013.01); *H01F 5/06* (2013.01); *H01F 27/292* (2013.01); *H01F 2017/002* (2013.01)

(58) Field of Classification Search
CPC ............... H01F 17/0013; H01F 27/292; H01F 2017/002; H01F 17/04; H01F 27/2804; H01F 2017/048; H01F 2027/2809
USPC .......................................... 336/83, 200, 232
See application file for complete search history.

(56) References Cited

U.S. PATENT DOCUMENTS

| | | | | |
|---|---|---|---|---|
| 2008/0246579 | A1 | 10/2008 | Mizuno et al. | |
| 2013/0200980 | A1 | 8/2013 | Yokoyama et al. | |
| 2017/0103845 | A1 * | 4/2017 | Nagai | H01F 3/14 |
| 2017/0324158 | A1 | 11/2017 | Akiyama et al. | |
| 2020/0265986 | A1 | 8/2020 | Mizukami et al. | |
| 2022/0262558 | A1 * | 8/2022 | Nagai | H01F 27/2804 |
| 2024/0055174 | A1 | 2/2024 | Mizukami et al. | |

FOREIGN PATENT DOCUMENTS

| | | | | | |
|---|---|---|---|---|---|
| JP | 2009-44030 | A | | 2/2009 | |
| JP | 2013-162101 | A | | 8/2013 | |
| JP | 2017-073495 | A | | 4/2017 | |
| JP | 2020-136392 | A | | 8/2020 | |
| JP | 2022126115 | A | * | 8/2022 | H01F 17/0013 |
| WO | 2007/072612 | A1 | | 6/2007 | |
| WO | 2016/143570 | A1 | | 9/2016 | |

* cited by examiner

*Primary Examiner* — Tuyen T Nguyen
(74) *Attorney, Agent, or Firm* — Oliff PLC

(57) ABSTRACT

In a multilayer coil component, first and second conductor patterns respectively have parallel parts that overlap in a lamination direction and non-parallel parts that do not overlap. The parallel parts of the first and second conductor patterns of one set are interconnected by a first through hole. The non-parallel parts of the first and second conductor patterns of sets adjacent to each other in the lamination direction are interconnected by a second through hole.

10 Claims, 4 Drawing Sheets

MULTILAYER COIL COMPONENT

TECHNICAL FIELD

The present disclosure relates to a multilayer coil component.

BACKGROUND

The multilayer inductor described in, for example, Japanese Unexamined Patent Publication No. 2013-162101 is known as a multilayer coil component of the related art. This multilayer inductor includes a laminate made of a plurality of insulator layers, an external electrode formed outside the laminate, and a coil conductor formed on a spiral in the laminate. Only two types of conductor patterns, C- and I-shaped, constitute a coil main body. The C-shaped patterns are larger in number than the I-shaped patterns.

SUMMARY

In the multilayer inductor, layers having the same conductor pattern overlap in the direction of lamination. Accordingly, the inductor is problematic in that through holes connecting the conductor patterns of the layers that are adjacent in the lamination direction are also continuous in the lamination direction at the same position and the conductor volume at the same position increases. Stress application is likely to occur at the position of conductor volume increase, and thus it is conceivable that through hole disconnection is likely to occur in the event of thermal expansion, thermal contraction, or the like.

The present disclosure has been made to solve the above problems, and an object of the present disclosure is to provide a multilayer coil component capable of suppressing the occurrence of through hole disconnection.

A multilayer coil component according to one aspect of the present disclosure includes a coil portion in an insulating element body forming a multilayer structure. The coil portion has a plurality of sets including first and second conductor pattern layers respectively having first and second conductor patterns. The first conductor pattern and the second conductor pattern respectively have parallel parts overlapping in a lamination direction, non-parallel parts not overlapping in the lamination direction, and pad portions used for inter-conductor pattern connection. In one set, first pad portions provided at the parallel part of the first conductor pattern and the parallel part of the second conductor pattern are connected to each other via a first through hole. A second pad portion provided at the non-parallel part of the first conductor pattern of the one set and a third pad portion provided at the non-parallel part of the second conductor pattern of a set positioned on one side in the lamination direction with respect to the one set are connected via a second through hole. The third pad portion provided at the non-parallel part of the second conductor pattern of the one set and the second pad portion provided at the non-parallel part of the first conductor pattern of a set positioned on the other side in the lamination direction with respect to the one set are connected via the second through hole.

In this multilayer coil component, the first through hole connecting the first conductor pattern and the second conductor pattern of one set connects the first pad portions provided at the parallel part to each other and the second through hole connecting the first and second conductor patterns of one set and the set that is adjacent to the one set connects the second and third pad portions provided at the non-parallel part. As a result, in this multilayer coil component, the position of the first through hole and the position of the second through hole can be dispersed when viewed from the lamination direction. By dispersing the positions of the through holes, it is possible to avoid an increase in the conductor volume at the same position. Accordingly, the occurrence of disconnection of the through holes can be suppressed even in the event of thermal expansion, thermal contraction, or the like.

The second pad portion and the third pad portion may overlap in the lamination direction in the one set. Also in this case, the relationship of dispersion between the position of the first through hole and the position of the second through hole is maintained and the symmetry of the first conductor pattern and the second conductor pattern is enhanced to lead to pattern simplification.

A void may exist between layers of the second pad portion and the third pad portion in the one set. In this case, the void allows the electrical resistivity between the layers of the second pad portion and the third pad portion to be higher than that of the element body material and the withstand voltage of the multilayer coil component can be improved.

A recess may be provided in at least one of a surface of the second pad portion on the third pad portion side and a surface of the third pad portion on the second pad portion side in the one set. In this case, the recess allows a sufficient inter-layer distance to be ensured between the second and third pad portions and the withstand voltage of the multilayer coil component can be improved.

A distance in the lamination direction between the first conductor pattern and the second conductor pattern in the one set may be exceeded by a distance in the lamination direction between the first conductor pattern of the one set and the second conductor pattern of the set positioned on the one side in the lamination direction with respect to the one set and a distance in the lamination direction between the second conductor pattern of the one set and the first conductor pattern of the set positioned on the other side in the lamination direction with respect to the one set. In this case, a sufficient inter-layer distance can be ensured between the sets that are adjacent to each other in the lamination direction and the withstand voltage of the multilayer coil component can be improved.

The element body may be configured by laminating a magnetic body layer containing metal magnetic particles, and the number of the metal magnetic particles between the second pad portion and the third pad portion in the one set may exceed the number of the metal magnetic particles positioned between the first conductor pattern and the second conductor pattern in the one set. The withstand voltage of the multilayer coil component can be improved by the metal magnetic particles between the second pad portion and the third pad portion being relatively large in number.

DETAILED DESCRIPTION

Hereinafter, a preferred embodiment of a multilayer coil component according to one aspect of the present disclosure will be described in detail with reference to the drawings.

Figure 1:
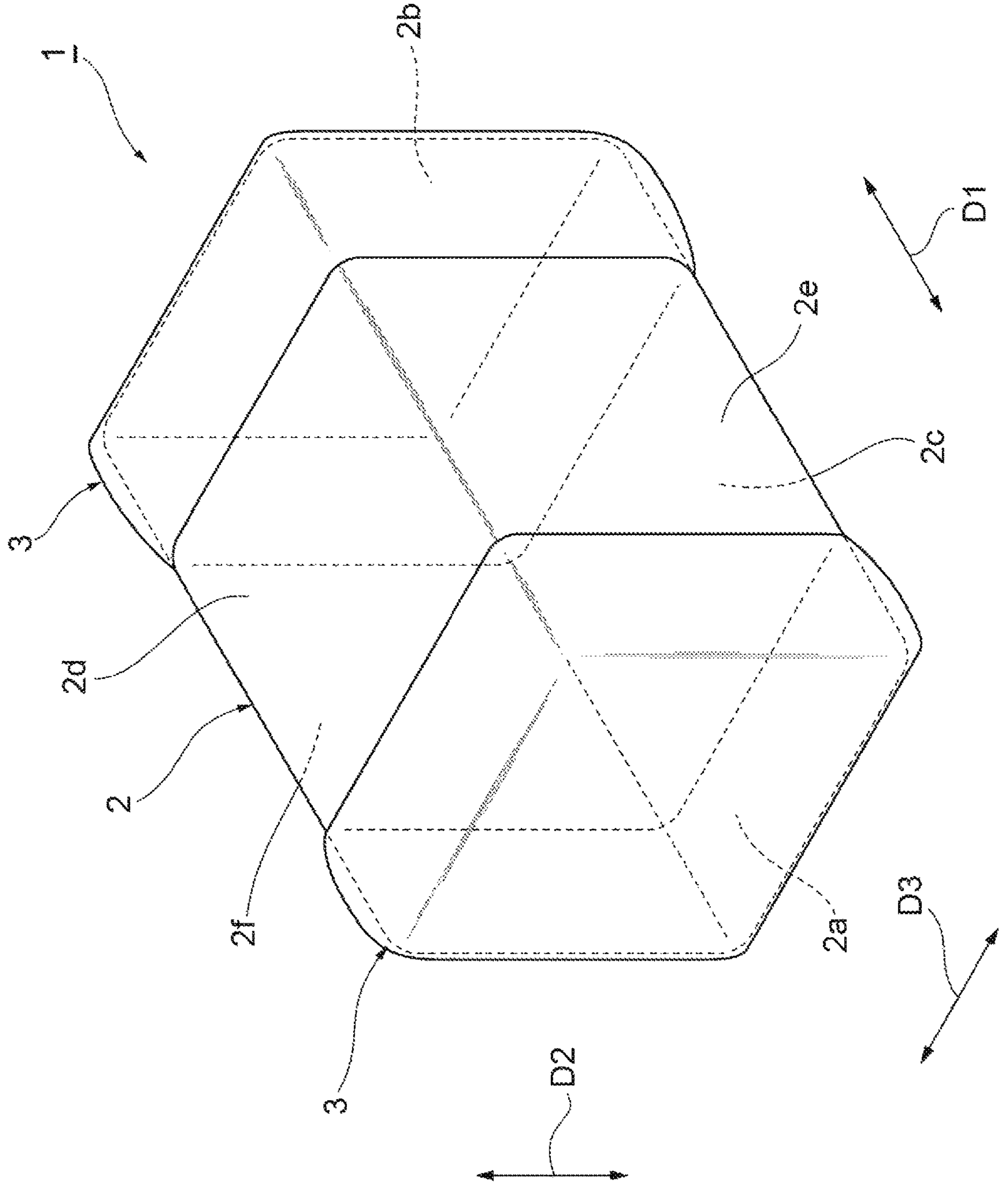
FIG. 1 is a perspective view illustrating an embodiment of a multilayer coil component.

FIG. 1 is a perspective view illustrating an embodiment of the multilayer coil component. As illustrated in FIG. 1, a multilayer coil component 1 includes an element body 2 having a rectangular parallelepiped shape and a pair of terminal electrodes 3 and 3. The pair of terminal electrodes 3 and 3 are respectively disposed in both end portions of the element body 2 and are separated from each other. The rectangular parallelepiped shape includes a rectangular parallelepiped shape in which the corner and ridge portions are chamfered and a rectangular parallelepiped shape in which the corner and ridge portions are rounded. The multilayer coil component 1 can be applied to, for example, a bead inductor or a power inductor.

The rectangular parallelepiped element body 2 has a pair of end surfaces 2*a* and 2*b* facing each other, a pair of main surfaces 2*c* and 2*d* facing each other, and a pair of side surfaces 2*e* and 2*f* facing each other. In the following description, the direction in which the pair of end surfaces 2*a* and 2*b* face each other is a first direction D1 and the direction in which the pair of main surfaces 2*c* and 2*d* face each other is a second direction D2. In addition, the direction in which the pair of side surfaces 2*e* and 2*f* face each other is a third direction D3. The first direction D1, the second direction D2, and the third direction D3 are orthogonal to each other. In the present embodiment, the pair of end surfaces 2*a* and 2*b* have a square shape and the pair of main surfaces 2*c* and 2*d* and the pair of side surfaces 2*e* and 2*f* have a rectangular shape. The main surface 2*c* (bottom surface in FIG. 1) can be a mounting surface. The mounting surface faces another electronic device when the multilayer coil component 1 is mounted on the electronic device (such as a circuit board and an electronic component).

Figure 2:
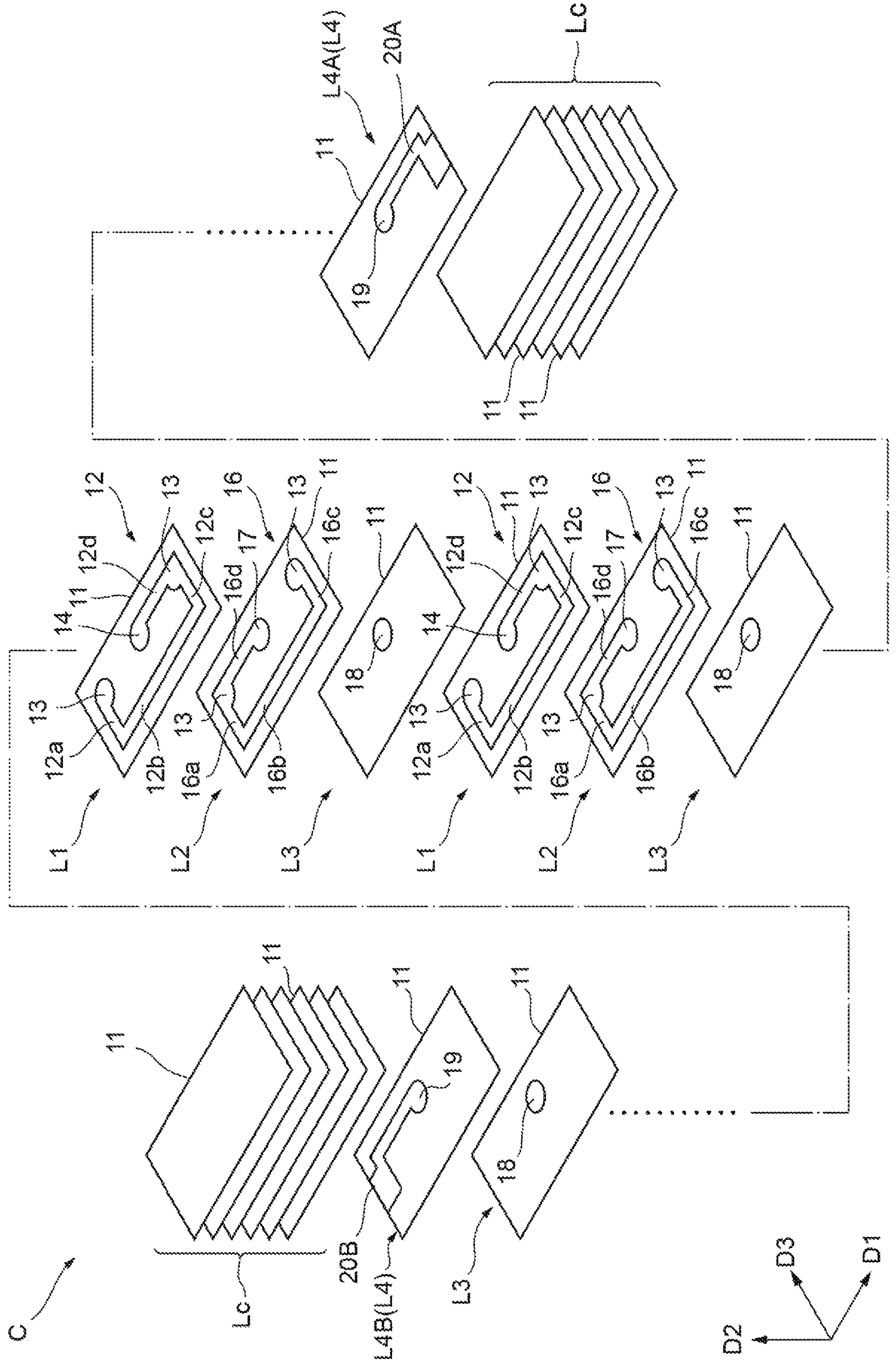
FIG. 2 is a diagram illustrating the layer configuration of the multilayer coil component.

The element body 2 is configured by laminating a plurality of magnetic body layers 11 (see FIG. 2). The magnetic body layers 11 are laminated in the facing direction of the main surfaces 2*c* and 2*d*. In other words, the lamination direction of the magnetic body layers 11 coincides with the second direction D2 (hereinafter, the facing direction of the main surfaces 2*c* and 2*d* may be referred to as "lamination direction"). Each magnetic body layer 11 has a substantially rectangular shape. In the actual element body 2, the magnetic body layers 11 are integrated to the extent that the boundaries between the layers cannot be visually recognized.

The element body 2 contains a plurality of metal magnetic particles (not illustrated). The metal magnetic particles are made of, for example, a soft magnetic alloy. The soft magnetic alloy is, for example, a Fe—Si-based alloy. In a case where the soft magnetic alloy is the Fe—Si-based alloy, the soft magnetic alloy may contain P. The soft magnetic alloy may be, for example, a Fe—Ni—Si-M-based alloy. "M" contains one or more elements selected from Co, Cr, Mn, P, Ti, Zr, Hf, Nb, Ta, Mo, Mg, Ca, Sr, Ba, Zn, B, Al, and rare earth elements.

In the element body 2, the metal magnetic particles are bonded to each other. The metal magnetic particles are bonded to each other by, for example, the oxide films formed on the surfaces of the metal magnetic particles being bonded to each other. In addition, the element body 2 includes a part filled with resin. The resin exists in at least a part between the plurality of metal magnetic particles. The resin is a resin that has electrical insulation. A silicone resin, a phenol resin, an acrylic resin, an epoxy resin, or the like is used as the resin. A void part that is not filled with resin may exist between the plurality of metal magnetic particles.

Each of the pair of terminal electrodes 3 and 3 has a flat rectangular parallelepiped shape. The pair of terminal electrodes 3 and 3 are disposed so as to cover the end surfaces 2*a* and 2*b* of the element body 2, respectively. The terminal electrode 3 is configured to contain a conductive material. The conductive material is, for example, Ag or Pd. The terminal electrode 3 is, for example, a baking electrode and is configured as a sintered body of conductive paste. The conductive paste contains conductive metal powder and glass frit. The conductive metal powder is, for example, Ag powder or Pd powder. A plating layer may be formed on the surface of the terminal electrode 3. The plating layer is formed by, for example, electroplating. The electroplating is, for example, electric Ni plating or electric Sn plating.

FIG. 2 is a diagram illustrating the layer configuration of the multilayer coil component. As illustrated in FIG. 2, a coil portion C is provided in the element body 2. The plurality of layers that form the coil portion C are configured to include a cover layer Lc, a first conductor pattern layer L1, a second conductor pattern layer L2, a connecting conductor layer L3, and a lead conductor layer L4. A magnetic body layer containing metal magnetic particles constitutes the cover layer Lc alone. A plurality of the cover layers Lc are respectively disposed on the main surface 2*c* side and the main surface 2*d* side of the element body 2.

A conductor part is formed in a predetermined pattern in each layer except the cover layer Lc. The conductor part is made of, for example, a metal material. The material of the metal material is not particularly limited, and Ag, Cu, Au, Al, Pd, a Pd/Ag alloy, and so on can be used. A Ti compound, a Zr compound, a Si compound, or the like may be added to the metal material. A printing method, a thin film growth method, or the like can be used in forming the conductor part.

The first conductor pattern layer L1 and the second conductor pattern layer L2 form the main part (winding part) of the coil portion C. In the present embodiment, one first conductor pattern layer L1, one second conductor pattern layer L2, and one connecting conductor layer L3 are laminated in this order to constitute one set. In the element body 2, a plurality of the sets are provided in the multilayer structure in accordance with the number of turns that is required in the coil portion C.

The first conductor pattern layer L1 has a first conductor pattern 12. The first conductor pattern 12 has a substantially rectangular ring shape as a whole. The first conductor pattern 12 has a first part 12*a* extending in the third direction D3 on the end surface 2*a* side, a second part 12*b* extending in the first direction D1 on the side surface 2*e* side, and a third part 12*c* extending in the third direction D3 on the end surface 2*b* side. In addition, the first conductor pattern 12 has a fourth part 12*d* extending in the first direction D1 on the side surface 2*f* side.

In the first conductor pattern 12, one end of the fourth part 12*d* is connected to the end portion of the third part 12*c* on the side surface 2*f* side and the other end of the fourth part 12*d* is positioned in the middle of the first conductor pattern layer L1 in the first direction D1. First pad portions 13 are respectively provided in the end portion of the first part 12*a* on the side surface 2*f* side and at the connection part between the third part 12*c* and the fourth part 12*d*. In addition, a second pad portion 14 is provided at the other end of the fourth part 12*d*.

The second conductor pattern layer L2 has a second conductor pattern 16. The second conductor pattern 16 has a substantially rectangular ring shape as a whole. The second conductor pattern 16 has a first part 16*a* extending in the third direction D3 on the end surface 2*a* side, a second part 16*b* extending in the first direction D1 on the side surface 2*e* side, and a third part 16$c$ extending in the third direction D3 on the end surface 2$b$ side. In addition, the second conductor pattern 16 has a fourth part 16$d$ extending in the first direction D1 on the side surface 2$f$ side.

In the second conductor pattern 16, one end of the fourth part 16$d$ is connected to the end portion of the first part 16$a$ on the side surface 2$f$ side and the other end of the fourth part 16$d$ is positioned in the middle of the first conductor pattern layer L1 in the first direction D1. The first pad portions 13 are respectively provided at the connection part between the first part 16$a$ and the fourth part 16$d$ and in the end portion of the third part 16$c$ on the side surface 2$f$ side. In addition, a third pad portion 17 is provided at the other end of the fourth part 16$d$.

As described above, in the present embodiment, both the other end of the fourth part 12$d$ where the second pad portion 14 is provided in the first conductor pattern 12 and the other end of the fourth part 16$d$ where the third pad portion 17 is provided in the second conductor pattern 16 are positioned in the middle in the first direction D1. Accordingly, the second pad portion 14 and the third pad portion 17 overlap in the lamination direction.

The connecting conductor layer L3 functions as a layer that ensures an inter-layer distance between the sets of the first conductor pattern layer L1 and the second conductor pattern layer L2 adjacent to each other in the lamination direction. The connecting conductor layer L3 has only a pad portion 18 as a conductor part. The pad portion 18 is disposed so as to correspond to the second pad portion 14 of the first conductor pattern 12 and the third pad portion 17 of the second conductor pattern 16. In other words, the pad portion 18, the second pad portion 14, and the third pad portion 17 overlap in the lamination direction.

The lead conductor layer L4 connects the coil portion C to the terminal electrodes 3 and 3. In the present embodiment, the lead conductor layer L4 has a lead conductor layer L4A disposed on the main surface 2$c$ side and a lead conductor layer L4B disposed on the main surface 2$d$ side. The lead conductor layer L4A is disposed on the lower layer side (main surface 2$c$ side) of the connecting conductor layer L3 of the set that is positioned closest to the main surface 2$c$ side. The lead conductor layer L4A has a pad portion 19 disposed so as to overlap the pad portion 18 of the connecting conductor layer L3 in the lamination direction and a lead conductor 20A extending from the pad portion 19 toward the edge on the end surface 2$b$ side. The pad portion 19 is electrically connected to the pad portion 18 of the connecting conductor layer L3 via a through hole (not illustrated). The lead conductor 20A is connected to the terminal electrode 3 covering the end surface 2$b$ at the end surface 2$b$.

On the main surface 2$d$ side, one connecting conductor layer L3 is disposed on the upper layer side (main surface 2$d$ side) of the first conductor pattern layer L1 of the set that is positioned closest to the main surface 2$d$ side. The lead conductor layer L4B has the pad portion 19 disposed so as to overlap the pad portion 18 of the connecting conductor layer L3 in the lamination direction and a lead conductor 20B extending from the pad portion 19 toward the edge on the end surface 2$a$ side. The pad portion 19 is electrically connected to the pad portion 18 of the connecting conductor layer L3 via a through hole (not illustrated). The lead conductor 20B is connected to the terminal electrode 3 covering the end surface 2$a$ at the end surface 2$a$.

Figure 3:
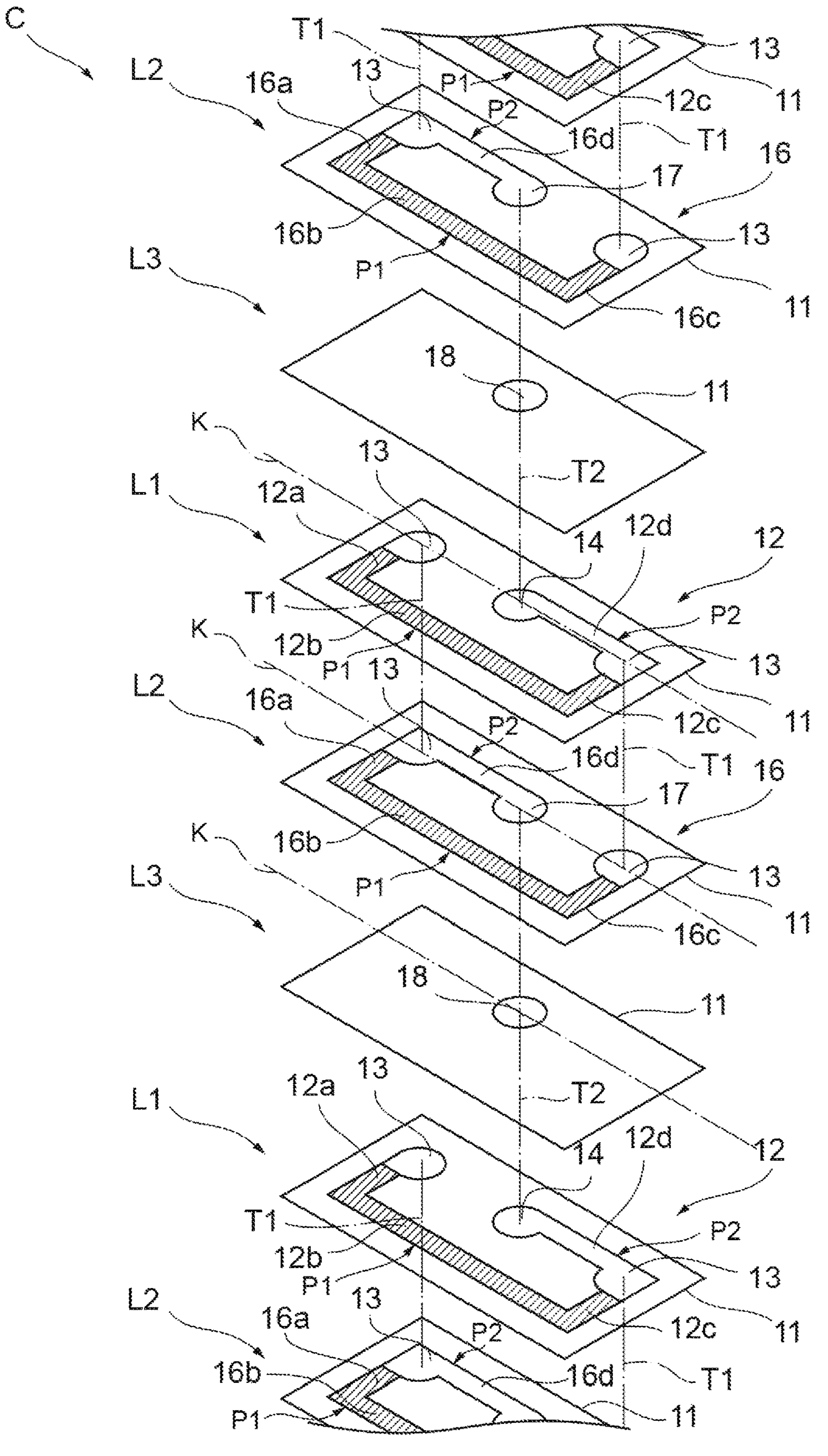
FIG. 3 is a diagram illustrating the connection relationship between first and second conductor pattern layers.

The connection relationship between the first conductor pattern layer L1 and the second conductor pattern layer L2 will be described in more detail below. FIG. 3 is a diagram illustrating the connection relationship between the first and second conductor pattern layers. As illustrated in FIG. 3, in connecting the first conductor pattern layer L1 and the second conductor pattern layer L2, the first conductor pattern 12 and the second conductor pattern 16 have parallel parts P1 that overlap in the lamination direction and non-parallel parts P2 that do not overlap in the lamination direction.

In the present embodiment, the first parts 12$a$ and 16$a$, the second parts 12$b$ and 16$b$, and the third parts 12$c$ and 16$c$ of the first conductor pattern 12 and the second conductor pattern 16 are the parallel parts P1 and the fourth parts 12$d$ and 16$d$ are the non-parallel parts P2. In one set, the first pad portions 13 and 13 provided at the parallel part P1 of the first conductor pattern 12 and the parallel part P1 of the second conductor pattern 16 are connected to each other via a first through hole T1. In one set, the second pad portion 14 provided at the non-parallel part P2 of the first conductor pattern 12 and the third pad portion 17 provided at the non-parallel part P2 of the second conductor pattern 16 are not connected.

The second pad portion 14 and the third pad portion 17 are used for connection between one set and a set adjacent to the one set in the lamination direction. In the example of FIG. 3, the second pad portion 14 provided at the non-parallel part P2 of the first conductor pattern 12 of one set and the third pad portion 17 provided at the non-parallel part P2 of the second conductor pattern 16 of the set that is positioned on one side in the lamination direction with respect to one set are connected to each other via the pad portion 18 of the connecting conductor layer L3 and a second through hole T2. In addition, the third pad portion 17 provided at the non-parallel part P2 of the second conductor pattern 16 of one set and the second pad portion 14 provided at the non-parallel part P2 of the first conductor pattern 12 of the set that is positioned on the other side in the lamination direction with respect to one set are connected to each other via the pad portion 18 of the connecting conductor layer L3 and the second through hole T2.

Figure 4:
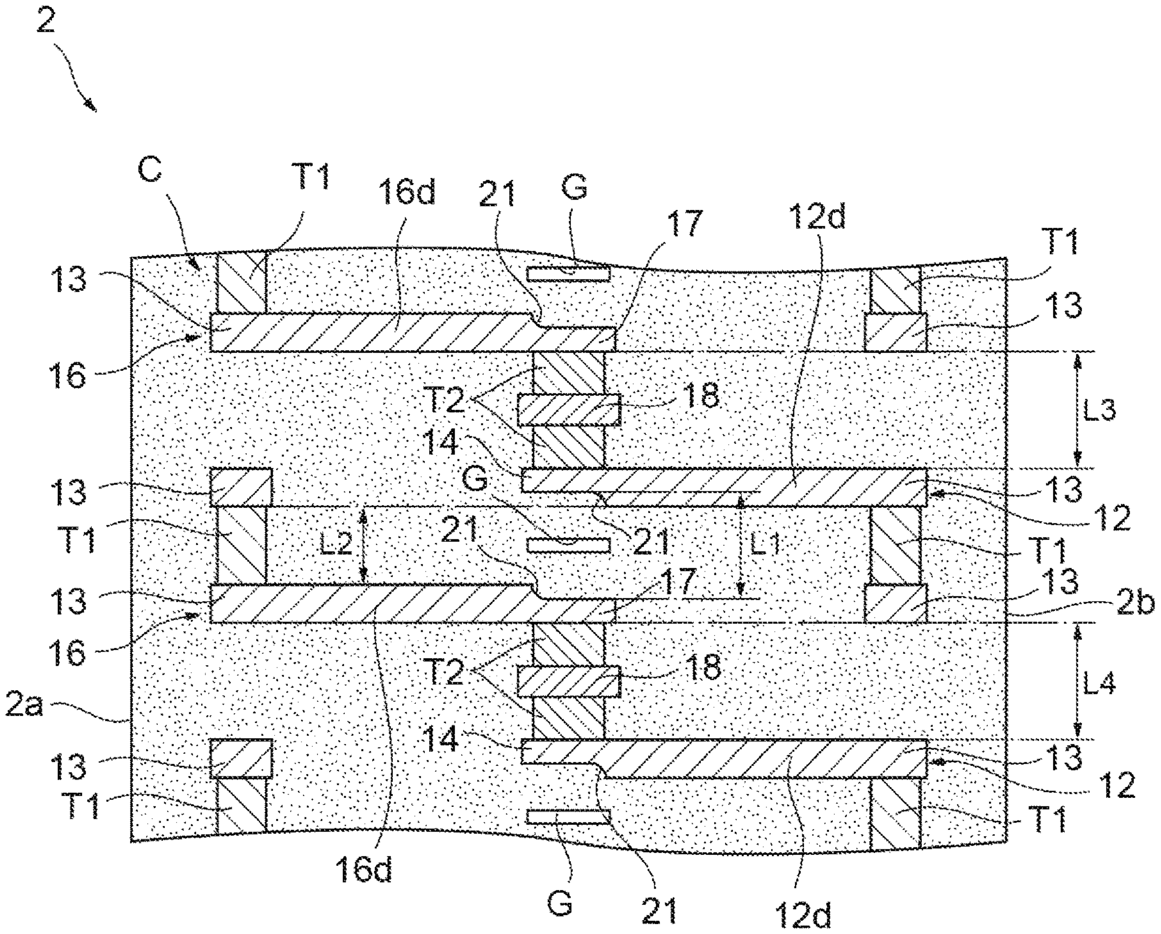
FIG. 4 is a cross-sectional view of a main part of the multilayer coil component.

FIG. 4 is a cross-sectional view of a main part of the multilayer coil component. Illustrated in FIG. 4 is the cross section of the element body 2 that is cut in the lamination direction at the position of a dashed line K illustrated in FIG. 3. Although the second pad portion 14 and the third pad portion 17 in one set are not connected as described above, a void G exists between the layers of the second pad portion 14 and the third pad portion 17 in one set as illustrated in FIG. 4. The void G can be formed by, for example, the difference in heat shrinkage between the element body 2 and the conductor part constituting the coil portion C. The void G may be formed by sandwiching a void forming member between the layers of the second pad portion 14 and the third pad portion 17 when the element body 2 is formed. In a case where the element body 2 includes a plurality of metal magnetic particles and a part filled with resin as in the present embodiment, some of the resin may be in the void G.

In addition, in one set in the present embodiment, a recess 21 is provided in at least one of the surface of the second pad portion 14 on the third pad portion 17 side and the surface of the third pad portion 17 on the second pad portion 14 side. In the present embodiment, the recess 21 is provided in each of these surfaces. Because of the recesses 21 and 21, a lamination-direction distance L1 between the second pad portion 14 and the third pad portion 17 in one set exceeds a lamination-direction distance L2 between the first conductor pattern 12 and the second conductor pattern 16 in one set.

The recess 21 can be formed by, for example, printing a magnetic material in the same shape as the second pad portion 14 at the position of the second pad portion 14 before forming the first conductor pattern 12 on the magnetic body layer 11 by printing or the like. In addition, the recess 21 can be formed in the third pad portion 17 by disposing a magnetic material between the second pad portion 14 and the third pad portion 17 and allowing the magnetic material to enter the third pad portion 17 side in the process of laminating and crimping the magnetic body layer 11.

In addition, in the present embodiment, the lamination-direction distance L2 between the first conductor pattern 12 and the second conductor pattern 16 in one set is exceeded by a lamination-direction distance L3 between the first conductor pattern 12 of one set and the second conductor pattern 16 of the set that is positioned on one side in the lamination direction with respect to one set and a lamination-direction distance L4 between the second conductor pattern 16 of one set and the first conductor pattern 12 of the set that is positioned on the other side in the lamination direction with respect to one set. In the example of FIG. 4, each of the distance L3 and the distance L4, which are equal to each other, exceeds the distance L2 (L2<L3=L4).

In addition, in the present embodiment, the number of metal magnetic particles between the second pad portion 14 and the third pad portion 17 in one set exceeds the number of metal magnetic particles positioned between the first conductor pattern 12 and the second conductor pattern 16 (between the parallel parts P1 and P1) in one set. In other words, in the present embodiment, the number of metal magnetic particles arranged in the lamination direction over the distance L1 exceeds the number of metal magnetic particles arranged in the lamination direction over the distance L2. As for the number of metal magnetic particles, the average values at a plurality of positions may be compared to each other.

As described above, in the multilayer coil component 1, the first through hole T1 connecting the first conductor pattern 12 and the second conductor pattern 16 of one set connects the first pad portions 13 and 13 provided at the parallel part P1 to each other and the second through hole T2 connecting the first conductor patterns 12 and the second conductor patterns 16 of one set and the set that is adjacent to the one set connects the second and third pad portions 14 and 17 provided at the non-parallel part P2. As a result, in the multilayer coil component 1, the position of the first through hole T1 and the position of the second through hole T2 can be dispersed when viewed from the lamination direction. By dispersing the positions of the first through hole T1 and the second through hole T2, it is possible to avoid an increase in the conductor volume at the same position. Accordingly, the occurrence of disconnection of the through holes T1 and T2 can be suppressed even in the event of thermal expansion, thermal contraction, or the like.

In the multilayer coil component 1, the second pad portion 14 and the third pad portion 17 in one set overlap in the lamination direction. In this case, the relationship of dispersion between the position of the first through hole T1 and the position of the second through hole T2 is maintained and the symmetry of the first conductor pattern 12 and the second conductor pattern 16 is enhanced to lead to pattern simplification.

In the multilayer coil component 1, the void G exists between the layers of the second pad portion 14 and the third pad portion 17 in one set. With this void G, the electrical resistivity between the layers of the second pad portion 14 and the third pad portion 17 can be higher than that of the element body material and the withstand voltage of the multilayer coil component 1 can be improved. In addition, in one set in the multilayer coil component 1, the recess 21 is provided in each of the surface of the second pad portion 14 on the third pad portion 17 side and the surface of the third pad portion 17 on the second pad portion 14 side. With these recesses 21, a sufficient inter-layer distance can be ensured between the second pad portion 14 and the third pad portion 17 and the withstand voltage of the multilayer coil component 1 can be improved.

In the multilayer coil component 1, the lamination-direction distance L2 between the first conductor pattern 12 and the second conductor pattern 16 in one set is exceeded by the lamination-direction distance L3 between the first conductor pattern 12 of one set and the second conductor pattern 16 of the set that is positioned on one side in the lamination direction with respect to one set and the lamination-direction distance L4 between the second conductor pattern 16 of one set and the first conductor pattern 12 of the set that is positioned on the other side in the lamination direction with respect to one set. As a result, a sufficient inter-layer distance can be ensured between the sets that are adjacent to each other in the lamination direction and the withstand voltage of the multilayer coil component 1 can be improved.

In the multilayer coil component 1, the element body 2 is configured by laminating the magnetic body layers 11 containing the plurality of metal magnetic particles. The number of metal magnetic particles between the second pad portion 14 and the third pad portion 17 in one set exceeds the number of metal magnetic particles positioned between the first conductor pattern 12 and the second conductor pattern 16 in one set. The withstand voltage of the multilayer coil component 1 can be improved by the metal magnetic particles between the second pad portion 14 and the third pad portion 17 being relatively large in number.

The present disclosure is not limited to the above embodiment. For example, although the recesses 21 in the above embodiment are provided in both the surface of the second pad portion 14 on the third pad portion 17 side and the surface of the third pad portion 17 on the second pad portion 14 side, the recess 21 may be provided in only one of the surfaces or may not be provided in any of the surfaces. The void G between the layers of the second pad portion 14 and the third pad portion 17 does not necessarily have to be provided.

The element body 2 does not necessarily have to contain metal magnetic particles and may be made of ferrite (such as Ni—Cu—Zn-based ferrite, Ni—Cu—Zn—Mg-based ferrite, and Cu—Zn-based ferrite), a dielectric material, or the like. In addition, although one set in the above embodiment is configured by one first conductor pattern layer L1, one second conductor pattern layer L2, and one connecting conductor layer L3, one set may be configured by one first conductor pattern layer L1 and one second conductor pattern layer L2 with the connecting conductor layer L3 omitted.

What is claimed is:

1. A multilayer coil component comprising a coil portion in an insulating element body forming a multilayer structure, wherein the coil portion has a plurality of sets including first and second conductor pattern layers respectively having first and second conductor patterns, the first conductor pattern and the second conductor pattern respectively have parallel parts overlapping in a lamination direction, non-parallel parts not overlapping in the lamination direction, and pad portions used for inter-conductor pattern connection, in one set, first pad portions provided at the parallel part of the first conductor pattern and the parallel part of the second conductor pattern are connected to each other via a first through hole, a second pad portion provided at the non-parallel part of the first conductor pattern of the one set and a third pad portion provided at the non-parallel part of the second conductor pattern of a set positioned on one side in the lamination direction with respect to the one set are connected via a second through hole, and the third pad portion provided at the non-parallel part of the second conductor pattern of the one set and the second pad portion provided at the non-parallel part of the first conductor pattern of a set positioned on the other side in the lamination direction with respect to the one set are connected via the second through hole, and wherein a void exists between layers of the second pad portion and the third pad portion in the one set.

2. The multilayer coil component according to claim 1, wherein the second pad portion and the third pad portion overlap in the lamination direction in the one set.

3. The multilayer coil component according to claim 1, wherein a recess is provided in at least one of a surface of the second pad portion on the third pad portion side and a surface of the third pad portion on the second pad portion side in the one set.

4. The multilayer coil component according to claim 1, wherein a distance in the lamination direction between the first conductor pattern and the second conductor pattern in the one set is exceeded by a distance in the lamination direction between the first conductor pattern of the one set and the second conductor pattern of the set positioned on the one side in the lamination direction with respect to the one set and a distance in the lamination direction between the second conductor pattern of the one set and the first conductor pattern of the set positioned on the other side in the lamination direction with respect to the one set.

5. The multilayer coil component according to claim 1, wherein the element body is configured by laminating a magnetic body layer containing metal magnetic particles, and the number of the metal magnetic particles between the second pad portion and the third pad portion in the one set exceeds the number of the metal magnetic particles positioned between the first conductor pattern and the second conductor pattern in the one set.

6. A multilayer coil component comprising a coil portion in an insulating element body forming a multilayer structure, wherein the coil portion has a plurality of sets including first and second conductor pattern layers respectively having first and second conductor patterns, the first conductor pattern and the second conductor pattern respectively have parallel parts overlapping in a lamination direction, non-parallel parts not overlapping in the lamination direction, and pad portions used for inter-conductor pattern connection, in one set, first pad portions provided at the parallel part of the first conductor pattern and the parallel part of the second conductor pattern are connected to each other via a first through hole, a second pad portion provided at the non-parallel part of the first conductor pattern of the one set and a third pad portion provided at the non-parallel part of the second conductor pattern of a set positioned on one side in the lamination direction with respect to the one set are connected via a second through hole, and the third pad portion provided at the non-parallel part of the second conductor pattern of the one set and the second pad portion provided at the non-parallel part of the first conductor pattern of a set positioned on the other side in the lamination direction with respect to the one set are connected via the second through hole, and wherein a distance in the lamination direction between the first conductor pattern and the second conductor pattern in the one set is exceeded by a distance in the lamination direction between the first conductor pattern of the one set and the second conductor pattern of the set positioned on the one side in the lamination direction with respect to the one set and a distance in the lamination direction between the second conductor pattern of the one set and the first conductor pattern of the set positioned on the other side in the lamination direction with respect to the one set.

7. The multilayer coil component according to claim 6, wherein the second pad portion and the third pad portion overlap in the lamination direction in the one set.

8. The multilayer coil component according to claim 6, wherein a void exists between layers of the second pad portion and the third pad portion in the one set.

9. The multilayer coil component according to claim 6, wherein a recess is provided in at least one of a surface of the second pad portion on the third pad portion side and a surface of the third pad portion on the second pad portion side in the one set.

10. The multilayer coil component according to claim 6, wherein the element body is configured by laminating a magnetic body layer containing metal magnetic particles, and the number of the metal magnetic particles between the second pad portion and the third pad portion in the one set exceeds the number of the metal magnetic particles positioned between the first conductor pattern and the second conductor pattern in the one set.

* * * * *